Dec. 16, 1924.

B. M. BROWNELL

FLEXIBLE PIPE JOINT

Filed May 7, 1923

Inventor:
Barnett Morse Brownell,
His Attorneys.

Patented Dec. 16, 1924.

1,519,110

UNITED STATES PATENT OFFICE.

BARNETT MORSE BROWNELL, OF ST. LOUIS, MISSOURI, ASSIGNOR TO DIAMOND METAL PRODUCTS CO., OF ST. LOUIS, MISSOURI, A CORPORATION OF MISSOURI.

FLEXIBLE PIPE JOINT.

Application filed May 7, 1923. Serial No. 637,101.

*To all whom it may concern:*

Be it known that I, BARNETT MORSE BROWNELL, a citizen of the United States, residing at St. Louis, Missouri, have invented a new and useful Flexible Pipe Joint, of which the following is a specification.

This invention relates to improvements in flexible pipe joints and consists in the novel construction hereinafter disclosed.

An object of the invention is to provide a pipe joint so arranged and constructed that it may be readily assembled and which provides a fluid-tight joint suitable for use as a pipe coupling in a steam, water or other fluid line.

The improved features of the invention will be apparent from the following detailed description thereof, taken in connection with the accompanying drawing in which—

Figure 1:
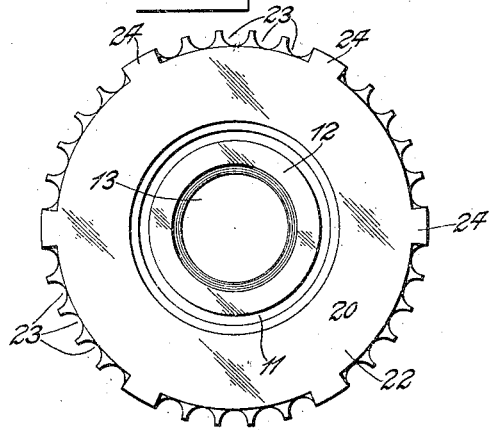
Fig. 1 is a plan view.
Figure 2:
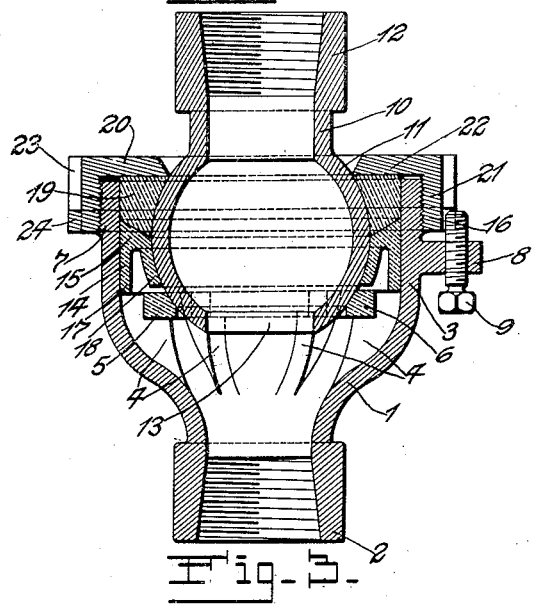
Fig. 2 is a vertical section.
Figure 3:
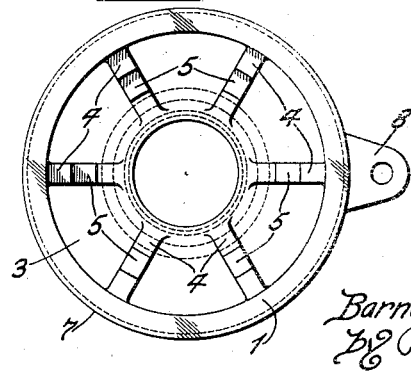
Fig. 3 is a plan view of the socket member of the joint.

In the embodiment of the invention illustrated in the drawing the socket member 1 is shown as formed from a casting, said member having a threaded throat 2 and a bell-shaped upper portion 3 provided with internal ribs 4, said ribs extending radially from the wall of the member inwardly and having their inner edges cut out to form notches 5. An annular member 6 is seated on the ribs and held in position by notches 5 thereof. The member 1 may be cast from any suitable metal such, for instance, as bronze or malleable iron. As the ring 6 is made separable from the member 1 it may be formed of other metal such, for instance, as Babbitt metal. The upper portion of the member 1 is provided with exterior threads 7 and projecting from the wall thereof is a lug 8 carrying a set screw 9. The threaded throat 2 of the member 1 provides means for coupling it to a section of the pipe line.

The ball member of the joint comprises a casting 10 having a spherical portion 11 and a throat portion 12, said throat portion being interiorly threaded for the reception of a pipe section of the pipe line. The spherical section of the member 10 has an opening 13 in the lower wall thereof to provide communication with the member 1.

The ball section 10 is mounted within the member 1, the lower wall of the spherical portion thereof resting upon the ring 6, it being noted that the edges of the ring 6 are beveled to provide a bearing surface for the lower portion of the spherical wall of the member 10.

A gasket 14 of flexible material, such as semi-hard rubber, is provided as the sealing element of the joint. This gasket comprises a ring section 15 having a downwardly inclined upper face 16 and diverging walls 17 and 18. It will be noted that the wall 17 is longer than the wall 18, so that when the gasket is seated in place within the member 1 the lower edge of the wall 17 rests upon and is supported by the ribs 4, leaving the wall 18 free to move radially. The outer surface of the wall 17 is vertical so that it rests firmly against the wall of the member 1, while the outer surface of the wall 18 is curved to conform to the contour of the outer surface of the spherical section 11 of the member 10. The gasket is held in place by a ring 19, said ring having its inner wall curved to conform to the contour of the spherical section 11 of the member 10 and its outer wall vertical to bear against the upper portion of the bell-section 3 of the member 1. The lower wall of the ring 19 is beveled to match the bevel of the upper face of the ring 14.

The parts are held in assembly by a retaining cap member 20, said cap member comprising an interiorly threaded section 21 adapted to screw over the threaded end of the bell-section 3 of the member 1. Extending inwardly from the section 21 is a flange 22 that extends over and bears against the upper surface of the ring member 19. The periphery of the cap is formed with notches 23 therein, and the cap includes upwardly extending spanner wrench flanges 24, so that it may be screwed down into position to hold the ring 19 and thereby the gasket in proper adjustment. After the adjustment has been effected manually by a spanner wrench, or other manipulative instrument, the parts are locked in position by adjustment of the set screw 9, the end of the set screw extending into a cooperating notch 23.

It will be understood that the member 10 and the member 20 are preferably made of cast bronze or malleable iron, or similar material, and that the retaining ring 19 is preferably made of some bearing metal such as Babbitt metal, or the like.

It will be noted also from the construction that the ring 6 and the member 19 provide complete bearing sockets for the ball section of the member 10, so that the gasket is relieved from supporting the ball section and is free to function as a sealing device.

The arrangement of the diverging walls of the gasket results in radial movement thereof by fluid presure passing through the joint, the wall 17 being moved radially in tight contact with the interior surface of the bell-section 3, and the wall 18 being moved inwardly in tight contact with the side wall of the ball-section of the member 10. The inclined matching surfaces of the upper face of the gasket and the lower face of the ring 19 results in the upper outer edge of the gasket member seating tightly to seal the joint between the ring 19 and the wall of the bell-section 3 of the member 1. As the ball-section is supported entirely by the rings 6 and 19 and as the wall 18 is free to move radially not only will a tight joint be effected but binding of the joint will be prevented and the wear on the surface of the gasket contacting with the ball member will be greatly reduced. This results in a freely movable joint that will be perfectly sealed in its various positions.

I am aware that the invention may be modified in various particulars without departing from the spirit and scope thereof.

I do not limit myself unessentially, but what I claim and desire to secure by Letters Patent is:—

1. A pipe coupling comprising a socket member and a ball member, a support for the ball member spaced from the wall of the socket member, a second support for the ball member, and a gasket between the socket member and the ball member positioned between said two supports.

2. A pipe coupling comprising a socket member and a ball member, ribs extending inwardly from the wall of the socket member, a supporting ring carried by said ribs thereby providing a space between the wall of the ring and the socket member, a second support for the socket member spaced away from said first named support, and a gasket member located between said ring and said second support, said gasket member having flexible walls capable of radial movement against the inner wall of the socket member and against the wall of the ball member by fluid pressure passing through said coupling.

3. A pipe coupling comprising a socket member and a ball member, ribs extending inwardly from the wall of the socket member, a supporting ring carried by said ribs thereby providing a space between the wall of the ring and the socket member, a second support for the socket member spaced away from said first named support, a gasket member located between said ring and said second support, said gasket member having flexible walls capable of radial movement against the inner wall of the socket member and against the wall of the ball member by fluid pressure passing through said coupling, and an adjustable cap for maintaining the elements in assembly.

4. A pipe coupling comprising a socket member and a ball member, ribs extending inwardly from the wall of the socket member, a supporting ring carried by said ribs thereby providing a space between the wall of the ring and the socket member, a second support for the socket member spaced away from said first named support, a gasket member located between said ring and said second support, said gasket member having flexible walls capable of radial movement against the inner wall of the socket member and against the wall of the ball member by fluid pressure passing through said coupling, an adjustable cap for maintaining the elements in assembly, and a lock device for said cap.

5. A pipe coupling, comprising a socket member having a bell-shaped portion, radial ribs extending inwardly from the inner wall of said bell portion, a ring carried by said ribs, a ball section seated on said ring, a gasket having diverging flexible walls supported by said ribs, a retaining member for the gasket, said gasket and retaining member having wedging contact with each other, and means for adjusting and maintaining said retaining member in assembled relation.

6. A pipe coupling comprising a socket member and a ball member, said ball member fitting within the socket member, radial ribs within the socket member, a ring supported by said ribs and constituting a complete annualar support for seating the ball member, a gasket mounted above said ring, said gasket having flexible walls adapted to be forced against the surface of the ball member and the surface of the socket member by fluid pressure passing through the coupling, a retaining ring serving as a complete annular support for the ball section above the gasket and also serving to hold the gasket in position, and a member for holding the parts in assembled relation.

BARNETT MORSE BROWNELL.